United States Patent [19]
Martinez-Sanchez

[11] Patent Number: 5,960,221
[45] Date of Patent: Sep. 28, 1999

[54] CAMERA WITH AUTOMATIC FILM INITIALIZATION RESPONSIVE TO CARTRIDGE SENSOR

[75] Inventor: Juan I. Martinez-Sanchez, Rochester, N.Y.

[73] Assignee: Eastman Kodak Company, Rochester, N.Y.

[21] Appl. No.: 09/137,898

[22] Filed: Aug. 20, 1998

[51] Int. Cl.[6] .................................................. G03B 1/00
[52] U.S. Cl. .................................................. 396/408
[58] Field of Search ........................... 396/403, 406–410

[56] References Cited

U.S. PATENT DOCUMENTS

| | | |
|---|---|---|
| 4,340,291 | 7/1982 | Berg . |
| 4,653,886 | 3/1987 | Malloy-Desormeaux . |
| 4,716,428 | 12/1987 | Kawamura et al. . |
| 4,752,795 | 6/1988 | Malloy-Desormeaux . |
| 4,896,180 | 1/1990 | Lawther . |
| 5,255,034 | 10/1993 | Shimada et al. . |
| 5,689,733 | 11/1997 | Zawodny et al. . |

*Primary Examiner*—Howard B. Blankenship
*Attorney, Agent, or Firm*—Francis H. Boos, Jr.

[57] ABSTRACT

In a low cost camera, film initialization to a first exposure frame by a time constant controlled drive circuit in which the time constant circuit is reset by a "cartridge present" sensor switch as a consequence of removing a film cartridge from the camera. This ensures that newly loaded film will be automatically initialized to the first exposure position without requiring the camera user to remember to actuate a shutter release button multiple times to achieve proper initialization. A flash charger circuit in the camera is automatically started at the end of frame advance or at the end of film initialization by opening of a film metering sensor switch that allows discharge of a capacitor into the time constant circuit, capacitor discharge generating a starting pulse sent to the charger circuit.

6 Claims, 2 Drawing Sheets

CAMERA WITH AUTOMATIC FILM INITIALIZATION RESPONSIVE TO CARTRIDGE SENSOR

CROSS-REFERENCE TO RELATED APPLICATION

Cross-reference is made to commonly assigned, copending
U.S. application Ser. No. 09/137905 entitled "Camera With Automatic Film Initialization" filed concurrently herewith.

FIELD OF THE INVENTION

The invention relates generally to the field of photographic cameras, and in particular to cameras with motorized film drives that automatically advance newly loaded film to the frame 1 position.

BACKGROUND OF THE INVENTION

Photographic cameras with motorized film drives are known that will advance newly loaded film to the frame 1 position. High end cameras utilize microprocessor controls that will sense the presence of a cartridge and upon closing of the camera back will initiate the motor drive to advance the film to the first frame position whereupon the motor drive will be terminated. However, the use of microprocessor controls is an expensive proposition and is not suitable for low cost cameras. Low cost motorized cameras are also known that will advance film to the first frame position. These cameras, however, generally require that, after the film cartridge is inserted and the camera back is closed, the motor be activated by pressing the shutter release button. The problem here is that if a consumer loads film in this type of camera but for some reason the film is not transported to the take-up reel and is not advanced with each press of the shutter release, the consumer thinks that images are being captured but, in fact, they are not. An additional problem is that consumers do not always remember to advance the film to frame 1 to expose their first image but rather start as soon as film has been loaded. The result is that they may lose several images which they think have been captured. There is a need, therefore, for a low cost film initialization arrangement that will automatically advance the film to the first frame position after a fresh film cartridge is loaded without requiring further action by the consumer such as actuating the shutter release button.

Additionally, upon initialization, it is highly desirable to cause the flash charger circuit in a flash-equipped camera to begin charging so that the camera user does not attempt to take a flash exposure picture after loading fresh film in the camera only to have the flash fail due to the fact that the charge voltage on the flash capacitor is below a minimum threshold needed to initiate and sustain flash output from the flash tube. Circuits are known which will automatically start the flash charger when a camera is made ready to take a picture, for example, a start switch actuated by opening a lens cover or by raising a flash arm into position. However, these circuits do not take into account the possibility that the camera user may reload a fresh film cartridge without having previously closed the lens cover or lowered the flash arm. Thus it is possible that the flash charger may not be restarted in such an instance and thus the first picture will not have the benefit of flash fire.

SUMMARY OF THE INVENTION

In accordance with one aspect of the invention, there is provided film initializing apparatus for a motor drive camera which comprises a film motor drive circuit; a resistor-capacitor time constant circuit coupled to the film motor drive circuit for actuating the motor drive circuit to advance film in the camera following taking of a picture or loading of a film cartridge into the camera; and a discharge path for the capacitor of the time constant circuit. The film initialization apparatus also includes a "cartridge present" sensor switch having first switch contacts which close in response detection of a cartridge present in the camera and second switch contacts which close only when a film cartridge is not present in the camera, the second switch contacts being in circuit with the discharge path and the capacitor of the time constant circuit, whereby removal of a film cartridge from the camera effects closure of the switch contacts to automatically reset the time constant circuit to allow operation of the motor drive circuit for a sufficient time determined by the time constant circuit to ensure advancing of the film to a first exposure frame position during film initialization in the camera.

In another aspect of the invention, there is provided a method of initializing film loading in a camera in response to removing and replacing film cartridges in the camera, the camera having a motor drive circuit including a resistor-capacitor time constant circuit, wherein the method comprises providing switch contacts of a "cartridge present" sensor switch in circuit with a capacitor discharge path for the capacitor in the time constant circuit; closing the switch contacts in response to removal of a film cartridge from the camera; and opening the switch contacts in response to insertion of a film cartridge into the camera. By this method, the time constant circuit is automatically reset to an initial condition to allow operation of the motor drive circuit for a sufficient time determined by the time constant circuit to ensure advancing of the film to a first exposure frame position during film initialization in the camera.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
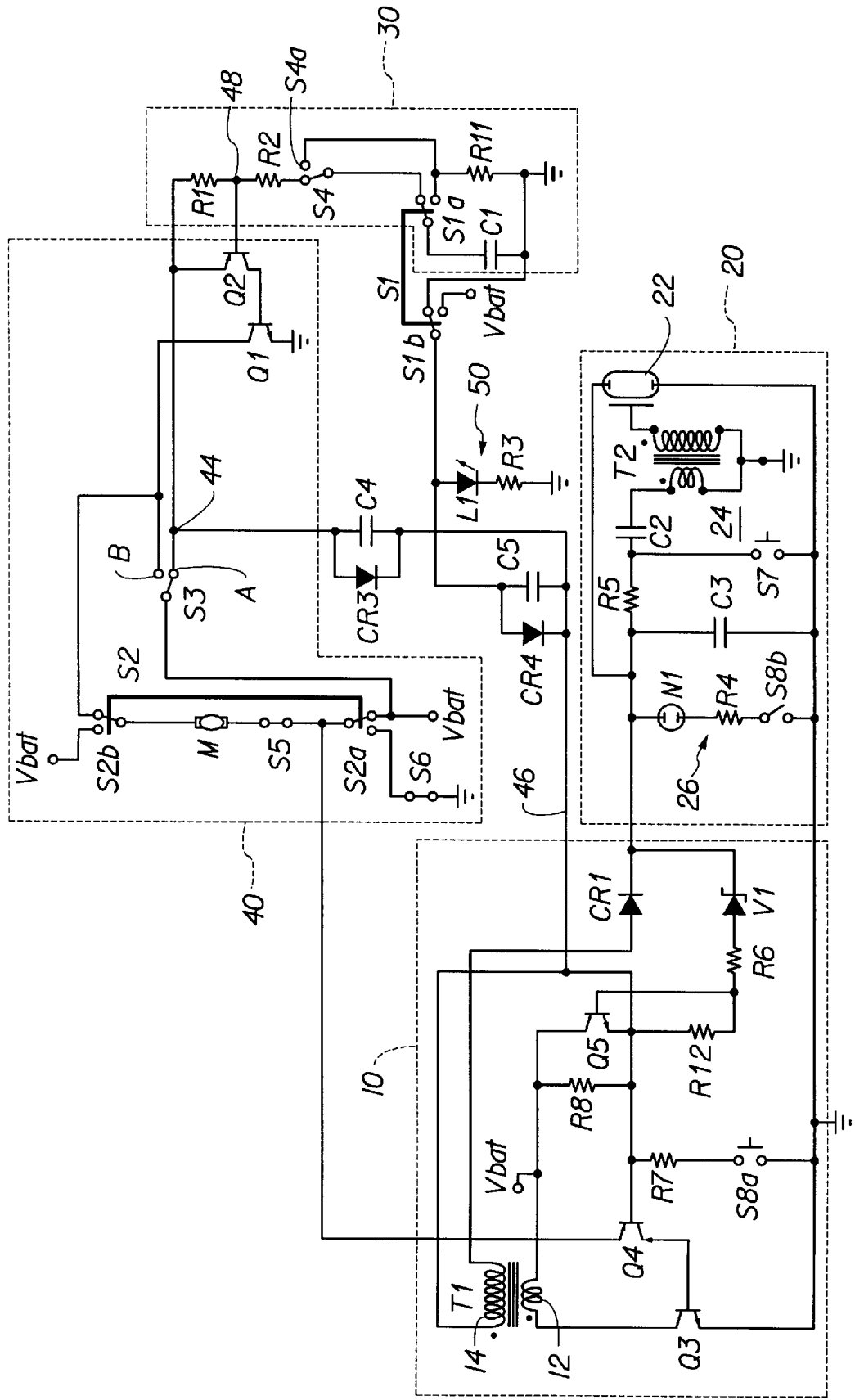
FIG. 1 is a circuit schematic of camera electronics for a low cost motor drive camera with film initialization circuit in accordance with one embodiment of the invention.

In FIG. 1, block 10 is a flash charger circuit, block 20 is a flash emission circuit, block 30 is a time constant circuit embodying principles of the present invention and block 40 is a film motor drive circuit. In the flash charger circuit 10, oscillator transistor Q3 has its collector connected through the primary winding 12 of oscillation step-up transformer T1 to a positive voltage source Vbat. Driver transistor Q4 has its collector connected to the base of oscillator transistor Q3 and its emitter to Vbat through the normally closed contacts S2a of rewind switch S2. This latter connection ensures that charger will not operate while the rewind switch S2 is depressed. Resistors R8 and R7 provide a low bias state to turn transistor Q4 ON when momentary lens cover switch S8a is briefly closed while the lens cover is being opened. Turning driver transistor Q4 ON provides base-emitter current to oscillator transistor Q3 thereby driving Q3 into conduction and starting oscillation in the charger circuit. Once started, oscillation continues until forcibly stopped as described later. The stepped-up oscillatory output of transformer T1 is rectified by diode CR1 and applied to charge main flash capacitor C3 in flash circuit 20. Flash circuit 20 is a conventional flash circuit comprising flash tube 22, trigger circuit 24 including transformer T2, capacitor C2 and flash sync switch S7. A ready light circuit 26 includes neon tube N1, current limiting resistor R4 and switch S8b. Switch S8b is operated by the lens cover to be closed whenever the lens cover is open and to be open whenever the lens cover is closed. In this way, the ready light circuit is enabled while the camera is active and disabled otherwise. Varistor V1 and transistor switch Q5 comprise a feedback path that forcibly disables oscillator operation. When the flash capacitor C3 reaches full charge level, for example 350 volts, the varistor breaks down and applies a forward bias to the base-emitter junction of transistor Q5, turning Q5 ON. This, in turn, causes a reverse bias to be applied to the base-emitter junction of drive transistor Q4, turning Q4 OFF, thereby removing base-emitter current from oscillator Q3 to stop oscillations in the charger circuit.

Film drive circuit 40 includes a reversible dc drive motor M, film rewind switch S2, tandem connected drive motor control transistors Q1, Q2, and a film metering switch S3. The park lever switch S6 is closed when film is in the camera chamber. When the camera is in reverse and the end of the film passes the lever (at this point, the end of the film is very close to the window of the cartridge), the switch opens and motor stops. The poles of switch S2 are shown in the forward drive position. When switch S2 is pressed, the polarity applied to the drive motor is reversed to reverse the drive direction of the motor for film rewind. With switch S2 in the forward drive setting, actuation of the drive motor is controlled by turning transistor Q1 ON to provide a ground return path for the motor circuit. Metering switch S3 is actuated in known manner by a metering mechanism in the camera film path to move from its normal position at "de-meter" contact "A" to its normal position at the "meter" switch contact "B" at a time when film has been advanced to the next available exposure frame position. Once the film is properly positioned, metering switch S3 stays at the "meter" position, contact "B". When a picture is taken by pressing the shutter release button, meter switch is moved to the "de-meter" position "A" to apply Vbat to the collector of transistor Q2.

A timer circuit 30 includes a resistor-capacitor time constant circuit comprising resistors R1, R2 and capacitor C1. The upper end of the time constant circuit is connected to Vbat through contact "A" of metering switch S3. An intermediate terminal 48 between resistors R1 and R2 is connected to the base of drive control transistor Q2 to set the operating base-emitter bias on the transistor. Contacts S1a of a two pole, double throw shutter release sensor switch S1 has an upper position in circuit with the time constant circuit and a lower position which connects time constant capacitor to a discharge path resistor R11. In accordance with one aspect of the invention, a "cartridge present" sensor switch, which is normally connected in series with the film drive motor M to prevent operation of the motor if there is no film cartridge in the camera, is now connected in circuit with the time constant circuit where it prevents operation of the timer circuit if no cartridge is present in the camera. Moving the cartridge present switch out of the motor circuit and into the time constant has the advantage that it takes resistance away from the motor path to avoid voltage drops in the motor path which would take power away from the motor. It has little voltage drop affect on the time constant circuit due to its relatively low resistance compared to the resistors in the time constant circuit. In contrast, the motor resistance is low and the switch contact resistance has a proportionately greater adverse effect. In a further aspect of the invention, the cartridge present switch S4 is provided with a back contact S4a which is connected to the discharge path resistor R11 to automatically discharge the time constant capacitor C1 whenever a film cartridge is removed from the camera.

Shutter release switch S1 is also provided with a second set of switch contacts S1b which when depressed apply Vbat to a red eye reduction circuit 50 comprising LED L1 and current limiting resistor R3. Switch contacts S1b also applies Vbat to capacitor C5 to generate a positive pulse applied to charger 10 via charger enable/disable line 46 to disable transistor Q4 thereby ensuring that the charger is not enabled during the picture taking cycle and ensuring film advance operation.

In operation, assuming film has been properly loaded in the camera, each time the shutter release button S1 is depressed, capacitor C1 is discharged toward ground potential through resistor R11 thereby resetting the time constant circuit. When the shutter button is released, capacitor C1 begins to charge toward Vbat through resistors R1, R2 and the "de-meter" contacts of switch S3. Initially, the potential at terminal 48 is low which drives transistor Q2 into conduction to drive base-emitter current through motor switch control transistor Q1 turning it ON. When transistor Q1 turns ON, the motor drive circuit is completed through the contacts of switch S2 to advance the film to the next frame. Once the next frame is in position, as detected by the metering mechanism in conventional manner, metering switch S3 moves to the "meter" contact "B", removing Vbat from terminal 44 and the collector of transistor Q2 and braking the forward movement of the motor. When Vbat is removed from terminal 44, capacitor C4, which is charged up to the potential of Vbat, discharges through the resistors R1 and R2 to the potential of capacitor C1. This causes a negative pulse to be applied on the enable/disable line 46 which drives transistor Q4 into conduction thereby restarting the oscillations in charger circuit 10. After each frame advance, the voltage across timer capacitor C1 remains at whatever voltage it was before the switch S3 moved to the "meter" position, normally close to GND. After the last frame is exposed, rewind switch S2 is pressed and motor M is actuated in the reverse direction to rewind the film back into the camera. When rewind is complete, the park lever S6 is opened to disable the motor M. At some point, the user then removes the film cartridge from the camera which causes S2 to revert to the forward position as the old cartridge is ejected, and also causes the switch S4 to open and move to back contact S4a. By virtue of the connection of this back contact to resistor R11, capacitor C1 is automatically discharged to ground potential thereby preparing the timer circuit for proper charging function when the user reloads film into the camera. When film is reloaded into the camera and the cartridge door is closed, sensor switch S5 in the motor circuit is closed and the closure of cartridge present switch S4 initiates the charging operation of the time constant circuit. Transistor Q2 is turned ON by the initial low potential on terminal 48 thereby actuating the film drive motor. The film drive continues until the metering mechanism in the camera detects that the first frame is in position in the exposure gate at which time the metering switch moves to the "meter" position "B" and stops the motor operation. If, for any reason, the film fails to load properly, the timer circuit 30 will continue to drive the motor until the potential on terminal 44 reaches a high enough level to turn Q2 OFF thereby opening the transistor Q1 switch and stopping the motor operation. In this event, the prolonged sound of the motor operation alerts the user to a problem with the loading operation. It can be seen that, by virtue of the back contact on the cartridge present switch S4, the residual charge on timer capacitor C1 is discharged automatically to prepare the camera for film loading and thereby avoids the problem of requiring the user to remember to reset the timer circuit by pressing the shutter release button to effect discharge through switch contacts S1b.

Figure 2:
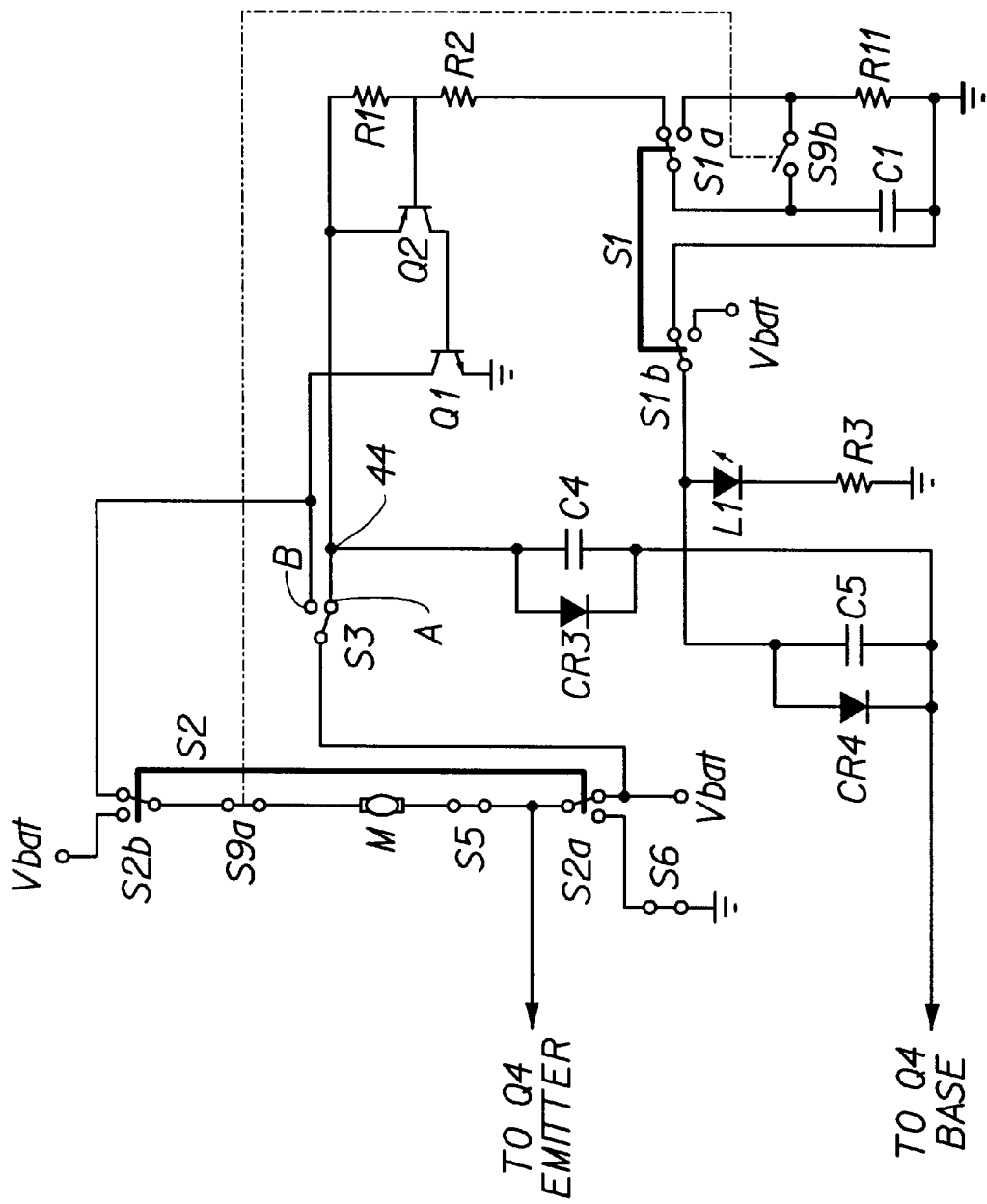
FIG. 2 is an alternative embodiment of the film initialization circuit of the invention.

Turning now to FIG. 2, an alternative embodiment of the invention is shown in which the illustrated circuit portion is, in all respects, the same as the corresponding portion of the FIG. 1 circuit except that a modified cartridge present sensor switch S9a is positioned directly in the motor drive circuit in lieu of the switch S4 in the time constant circuit of FIG. 1. Instead of the use of a back contact to effect discharge of capacitor C1 when a film cartridge is removed, the modified cartridge sensor switch is provided with a second pole and contact arrangement S9b which is connected directly between resistor R11 and capacitor C1. In this way, when the film cartridge is removed, the contacts S9b cause the capacitor to discharge, thereby resetting the timer circuit and preparing it to turn the drive motor on as described above when a fresh cartridge is inserted into the camera and the cartridge door is closed.

The use of the cartridge present switch to reset the initialization circuit is advantageous over the use of the door sensor switch in that, if the user inadvertently re-closes the cartridge door without having removed the exposed film cartridge, the timer circuit will not have been reset by the back contact or second pole of the cartridge present switch, thereby preventing inadvertent reinitialization of already exposed film into the camera exposure gate.

The invention has been described in detail with particular reference to certain preferred embodiments thereof, but it will be understood that variations and modifications can be effected within the spirit and scope of the invention.

PARTS LIST 10 flash charger circuit
12 primary winding
14 secondary winding
20 flash circuit
22 flash tube
24 trigger circuit
26 ready light circuit
30 film advance and initialization circuit
40 motor drive circuit
46 charger enable/disable line
C1 time constant circuit capacitor
C3 main flash capacitor
C4 flash charger enable pulse capacitor
C5 flash charger disable pulse capacitor
L1 red eye LED
M film drive motor
N1 neon ready light
Q1 motor drive switch transistor
Q2 transistor
Q3 oscillator transistor
Q4 oscillator drive transistor
Q5 charger disable transistor
R1 discharge path resistor
S1 shutter release switch
S2 film rewind switch
S3 film metering switch
S4 "cartridge present" sensor switch
S5 door sensor switch
S6 lens park sensor switch
S7 flash trigger switch
S8a, b lens cover sensor switch
S9a, b "cartridge present" switch
T1 step up transformer
T2 trigger transformer
V1 varistor

What is claimed is:

1. A method of initializing film loading in a camera in response to removing and replacing film cartridges in the camera, the camera having a motor drive circuit including a resistor-capacitor time constant circuit, the method comprising:

providing switch contacts of a "cartridge present" sensor switch in circuit with a capacitor discharge path for the capacitor in said time constant circuit;

closing said switch contacts in response to removal of a film cartridge from the camera; and opening said switch contacts in response to insertion of a film cartridge into the camera;

whereby said time constant circuit is automatically reset to an initial condition to allow operation of said motor drive circuit for a sufficient time determined by said time constant circuit to ensure advancing of said film to a first exposure frame position during film initialization in the camera.

2. Film initializing apparatus for a motor drive camera comprising:

a film motor drive circuit;

a resistor-capacitor time constant circuit coupled to said film motor drive circuit for actuating said motor drive circuit to advance film in the camera following taking of a picture or loading of a film cartridge into the camera;

a discharge path for the capacitor of said time constant circuit; and a "cartridge present" sensor switch having first switch contacts which close in response detection of a cartridge present in the camera and second switch contacts which close only when a film cartridge is not present in the camera, said second switch contacts being in circuit with the discharge path and the capacitor of the time constant circuit;

whereby removal of a film cartridge from the camera effects closure of said switch contacts to automatically reset said time constant circuit to allow operation of said motor drive circuit for a sufficient time determined by said time constant circuit to ensure advancing of said film to a first exposure frame position during film initialization in the camera.

3. The apparatus of claim 2 wherein said first switch contacts are in circuit with said time constant circuit.

4. The apparatus of claim 2 wherein said "cartridge present" switch comprises a single pole switch and said second switch contacts comprise a back contact on the single pole switch.

5. The apparatus of claim 2 wherein said "cartridge present" switch comprises a two pole switch; the first switch contacts are on a first pole in circuit with said motor drive circuit and the second switch contacts are on a second pole in circuit with the discharge path and capacitor of the time constant circuit.

6. A camera comprising:
(a) a film motor drive circuit for advancing film in the camera;
(b) a film initializing circuit comprising:
   (i) a resistor-capacitor time constant circuit coupled to said film motor drive circuit for actuating said motor drive circuit to advance film in the camera following taking of a picture or loading of a film cartridge into the camera;
   (ii) a discharge path for the capacitor of said time constant circuit; and
(c) a "cartridge present" sensor switch having first switch contacts which close in response detection of a cartridge present in the camera and second switch contacts which close only when a film cartridge is not present in the camera, said second switch contacts being in circuit with the discharge path and the capacitor of the time constant circuit;
(d) a film metering switch having first contacts for enabling film advance and second contacts for stopping film advance;
(e) a flash charging circuit; and
(f) a flash charger start capacitor connected between (i) said film metering switch and time constant circuit and (ii) said flash charging circuit to transmit a flash charging circuit start pulse to said flash charger circuit, when said metering switch switches from said first contacts to said second contacts at conclusion of a film initialization, by discharge of said flash charger start capacitor into said time constant circuit.

* * * * *